United States Patent [19]

Doyle et al.

[11] 3,813,579
[45] May 28, 1974

[54] ELECTRIC RECEPTACLE ASSEMBLY WITH GROUND FAULT PROTECTION

[75] Inventors: Richard C. Doyle, Orinda; Wallace W. Wahlgren, Oakland; Ellwood S. Douglas, Orinda, all of Calif.

[73] Assignee: The Rucker Company, Oakland, Calif.

[22] Filed: July 14, 1972

[21] Appl. No.: 271,988

Related U.S. Application Data

[63] Continuation-in-part of Ser. Nos. 87,713, Nov. 9, 1970, abandoned, and Ser. No. , , Continuation-in-part of Ser. No. 141,151, May 7, 1971, abandoned.

[52] U.S. Cl. ............... 317/18 D, 317/27 R, 335/18
[51] Int. Cl. .............................................. H02h 3/26
[58] Field of Search......... 317/18 R, 18 A, 18 D, 38; 339/147, 14 R, 27 R; 335/18, 170, 171; 337/66; 200/159 A

[56] References Cited
UNITED STATES PATENTS

| | | | |
|---|---|---|---|
| 2,304,086 | 12/1942 | Young | 335/170 |
| 3,213,321 | 10/1965 | Dalziel | 317/18 D |
| 3,373,256 | 3/1968 | Reed | 200/159 A |
| 3,407,337 | 10/1968 | Benham | 317/18 D |
| 3,441,799 | 4/1969 | Delafrange | 317/58 |
| 3,457,531 | 7/1969 | Goodwin | 335/170 |
| 3,658,980 | 1/1971 | Florance | 317/18 D |
| 3,611,035 | 10/1971 | Douglas | 317/18 D |

Primary Examiner—J. D. Miller
Assistant Examiner—Patrick Salce
Attorney, Agent, or Firm—Flehr, Hohbach, Test, Albritton & Herbert

[57] ABSTRACT

Electric receptacle assembly having a ground fault detector and current interrupter as an integral part thereof. The assembly is suitable for mounting in a standard receptacle box of the size commonly used for housing a double socket outlet, and it includes means for testing the operation of the system and means for providing a visual indication of the occurrence of a ground fault.

18 Claims, 19 Drawing Figures

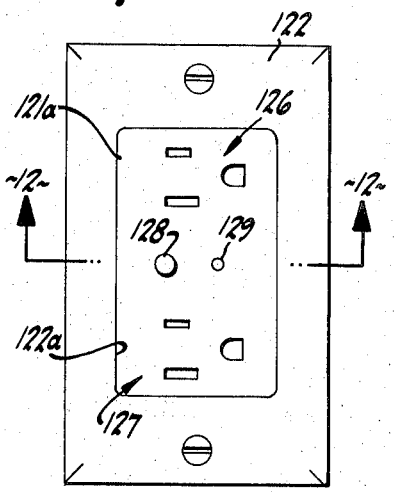
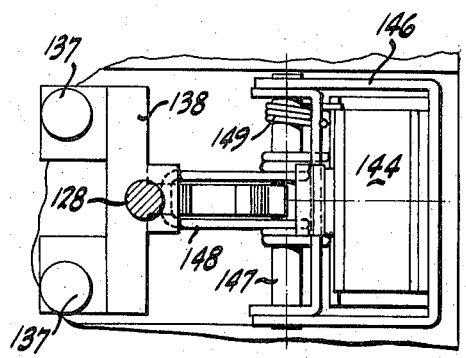
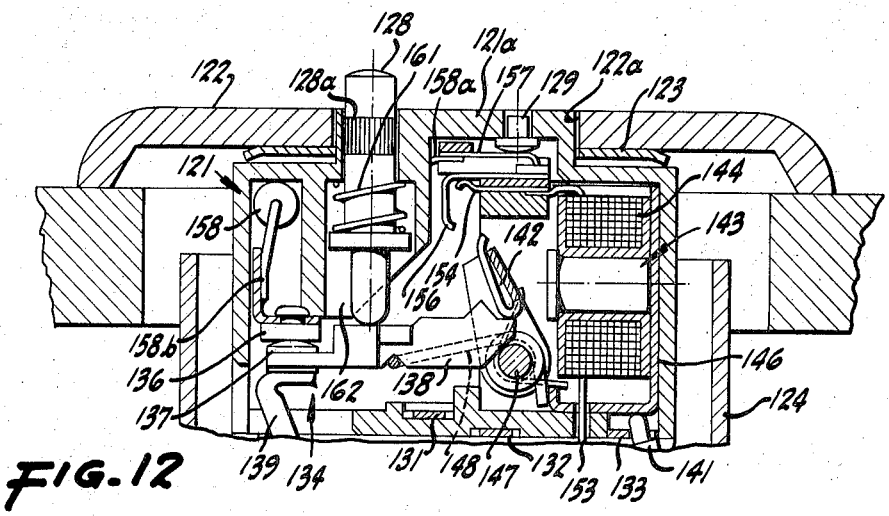
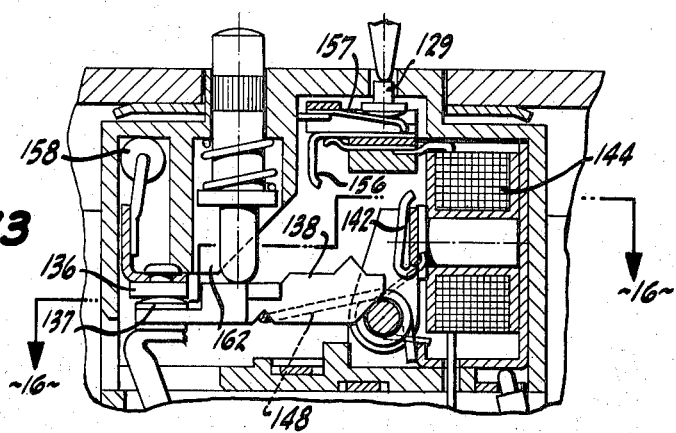

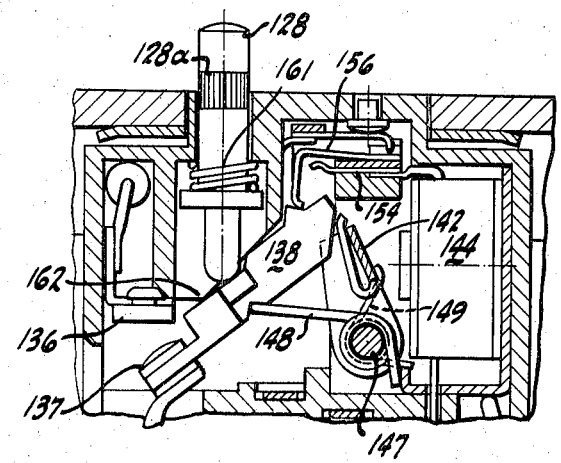
FIG.-14
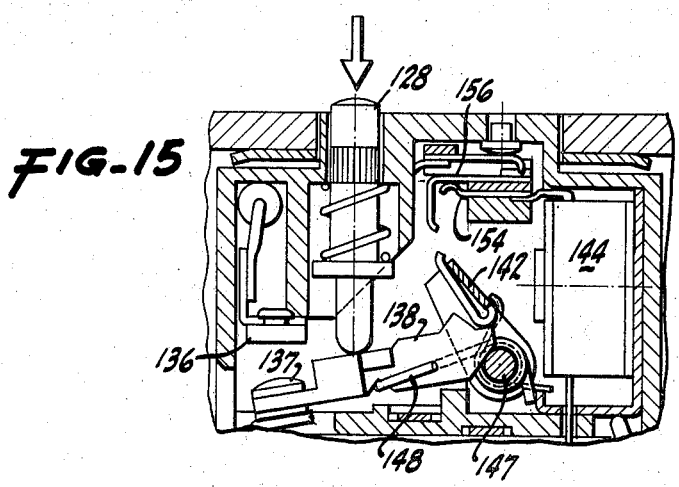
FIG.-15
FIG.-17
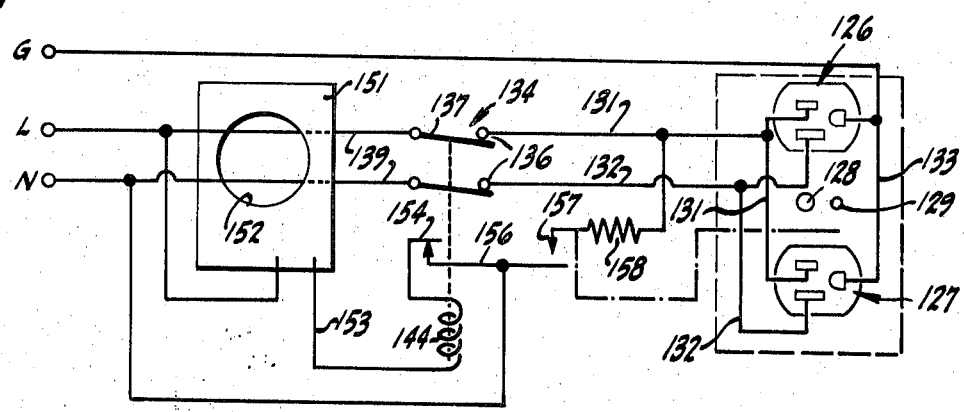

ELECTRIC RECEPTACLE ASSEMBLY WITH GROUND FAULT PROTECTION

CROSS-REFERENCE TO RELATED APPLICATIONS.

This is a continuation-in-part of copending application Ser. No. 87,713, filed NOv. 9, 1970, now abandoned; and copending application Ser. No. 141,151, filed May 7, 1971, now abandoned.

BACKGROUND OF THE INVENTION

This invention pertains generally to electrical power distribution systems and devices for protecting human life against electrical shock and more particularly to a receptacle assembly having a ground fault protector as an integral part thereof.

Electrical receptacle boxes are widely used in homes, industry, and numerous other applications to provide means for delivering power from a distribution system to electrically operated appliances. These receptacle boxes are relatively small in size, and they typically include one or more sockets adapted for receiving the connecting plugs of the appliances. Where one of the conductors in the distribution circuit is grounded, as is common practice in the United States, a person who is in contact with the ground can receive a serious electrical shock merely by touching an ungrounded conductor in the distribution system. Likewise, property can be severally damaged by contacting an ungrounded conductor. In either case, the current which flows from the ungrounded conductor to ground through the person or property is known as a ground fault current.

Many electrical appliances have metallic frames or chassis which are intentionally connected to the grounded conductor of the distribution system. When, however, the plug of such an appliance is inserted in a socket with the wrong polarity the frame or chassis is connected directly to the ungrounded or "hot" conductor, and a particularly serious shock hazard exists since the entire frame or chasis is "hot." A similar problem arises with appliances having an ungrounded chasis when the chasis somehow becomes connected to an ungrounded conductor.

In order to prevent serious electric shock due to hazards of the above character, ground fault detectors and current interrupters have heretofore been provided for monitoring the flow of current in the conductors of the distribution system and interrupting that flow when the current flowing to a load is not equal to the current flowing through the conductors back to the source. In order to provide sufficient sensitivity for protecting human life, the ground fault protective devices of the prior art have required bulky components. Because of their size, such devices generally have not been feasible for home use, and in the instances in which they have been used in homes, they have generally been connected at the building service entrance in an attempt to protect all of the electrical circuits and outlets in the building. Where a large number of circuits and outlets are being protected, the normal load current is very large, making it difficult to detect ground fault currents of the low level necessary to protect human life.

SUMMARY AND OBJECT OF THE INVENTION

The present invention provides an electric receptacle assembly with a built in ground fault detector and current interrupter which can be installed in a standard electrical box of the type commonly used for housing conventional electrical sockets. The ground fault detector utilizes techniques disclosed in copending applications Ser. No. 39,056, filed May 20, 1970, now U.S. Pat. No. 3,614,533; Ser. No. 19,625, filed Mar. 16, 1970, now U.S. Pat. No. 3,597,656; and Ser. No. 141,297, filed May 7, 1971, all assigned to the assignee of the present invention, to provide a fault current sensitivity on the order of 5 milliamperes. Means is provided for simulating a ground fault by creating an imbalance in the current in the conductors to test the operation of the system, and means is also provided for resetting the system following interruption of the current in response to a ground fault.

It is in general an object of the present invention to provide a receptacle assembly with ground fault protection which can be mounted in a standard electrical outlet box of the type commonly used to house a double socket wall outlet.

Another object of the invention is to provide a receptacle assembly of the above character which is suitable for protecting human against electrical shock.

Another object of the invention is to provide a receptacle assembly of the above character which includes means for testing the operation of the system.

Another object of the invention is to provide a receptacle assembly of the above character which includes means for resetting the system upon correction of the ground fault.

Additional objects and features of the invention will be apparent from the following description in which the preferred embodiment is set forth in detail in conjunction with the accompanying drawings.

BRIEF DESCRIPTION OF THE DRAWINGS

FIG. 11 is a front elevational view of a second embodiment of an electric receptacle assembly with ground fault protection incorporating the present invention.

FIG. 12 is a cross-sectional view taken along line 12—12 in FIG. 12.

FIGS. 13–15 are fragmentary cross-sectional views, illustrating the operation of the embodiment shown in FIGS. 11 and 12.

FIG. 16 is a cross-sectional view taken along line 16—16 in FIG. 13.

FIG. 17 is a wiring diagram of the receptacle assembly shown in FIGS. 11–14.

DESCRIPTION OF THE PREFERRED EMBODIMENT

Figure 1:
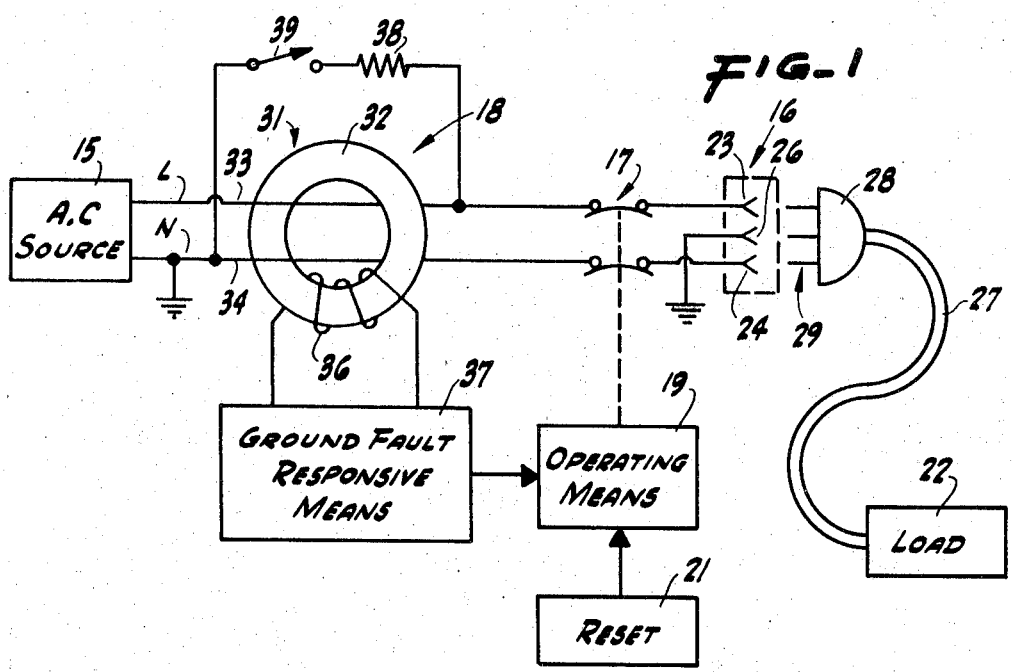
FIG. 1 is a block diagram of one embodiment of a ground fault protective system incorporation the present invention.
Figure 2:
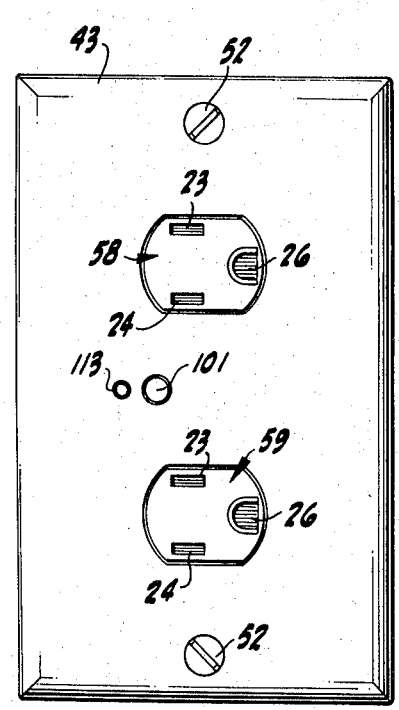
FIG. 2 is a front elevational view of one embodiment of an electric receptacle assembly with ground fault protection incorporating the present invention.
Figure 3:
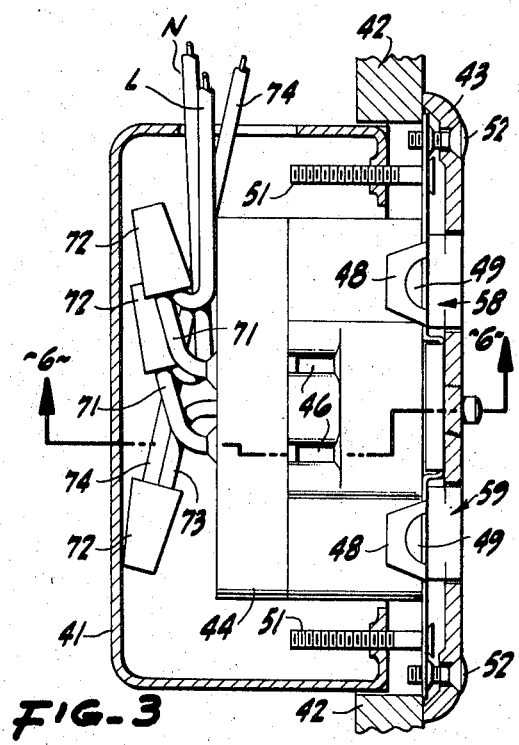
FIG. 3 is a side elevational view, partially sectioned, of the embodiment illustrated in FIG. 2.
Figure 4:
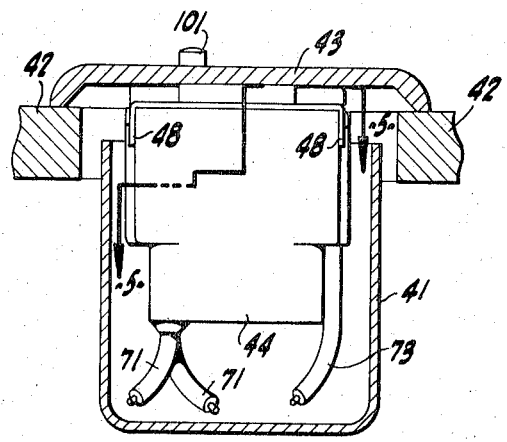
FIG. 4 is a bottom plan view, partially sectioned, of the embodiment illustrated in FIG. 2.
Figure 5:
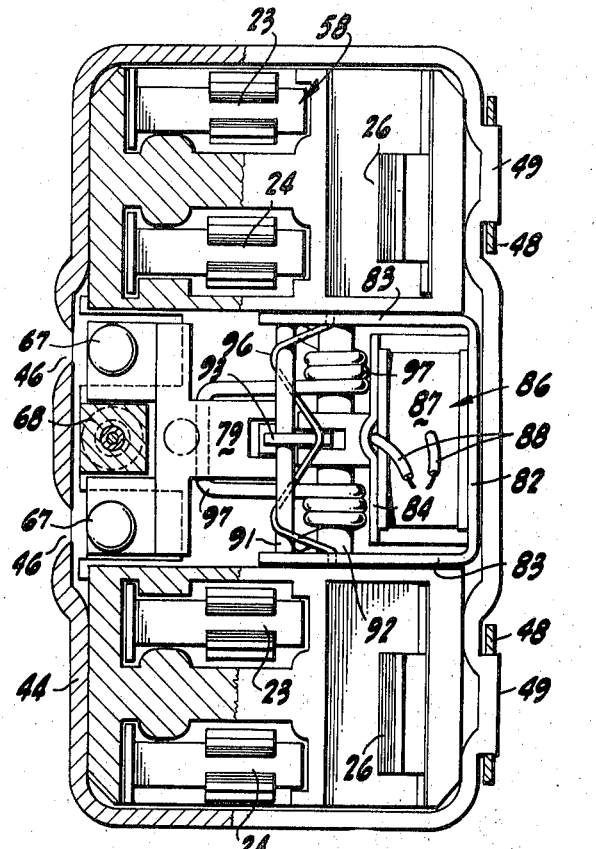
FIG. 5 is a cross-sectional view taken along line 5—5 in FIG. 4.

The present invention can be utilized with any A.C. power distribution system having a return path to ground at the source. Thus, it can be used in conventional single phase or poly phase circuits consisting of two, three or four wires, as long as some form of ground return is provided at the source end. In the drawing, the invention is illustrated in connection with a single phase, two wire system consisting of an A.C. source 15, an ungrounded line conductor L and a ground neutral conductor N. The neutral conductor N is connected to ground at its source end. Although illustrated as a direct connection, the ground return does not have to have a resistance of zero ohms. The invention will operate satisfactorily with a resistance as large as approximately 2,000 ohms in the ground return.

As illustrated in FIG. 1 the receptacle assembly of the present invention includes socket means 16, interrupter contacts 17 connected for controlling the flow of current between the conductors L and N and the socket means 16, ground fault detector means 18, and operating means 19 for opening the contacts 17 when a ground fault is sensed by the detecting means 18. Reset means 21 is provided for closing the contacts 17 after a ground fault has been corrected.

The socket means 16 provides means for delivering electrical energy from the conductors of the distribution system to an electrical appliance such as the load 22. In the preferred embodiment, this socket means is a conventional three prong socket having a line terminal 23 for connection to the line conductor, a neutral terminal 24 for connection to the neutral terminal, and a ground terminal 26 which is connected to ground. The load 22 typically includes a line cord or service cord 27 which includes a connecting plug 28 having a plurality of current carrying prongs 29. The socket means 16 is adapted for receiving the plug 28 in such manner that the prongs 29 contact the terminals therein.

In one preferred embodiment, the ground fault detecting means 18 is of the flux storage type which is disclosed in copending application Ser. No. 39,056, filed May 20, 1970 and assigned to the assignee of the present invention. This means includes a differential transformer 31 having a toroidal core 32, single turn primary windings 33 and 34 connected in series with the line and neutral conductors and passing through the toroidal core, and a secondary winding 36 consisting of a plurality of turns wound on the core. Under normal conditions, that is in the absence of a ground fault, the currents in the primary windings 33 and 34 are balances, producing a zero net flux in the core 32 and a zero output voltage across the secondary winding 36. Upon the occurrence of a ground fault, the currents in the primary windings 33 and 34 are no longer equal, a nonzero net magnetic flux is produced in the core 32, and a fault signal is induced in the secondary winding 36. As is described more fully in the referenced copending application, this fault signal is applied to one or more reactor cores where it is stored in the form of a flux signal. The stored flux signal is read out of the reactor cores by means of a pulsating signal and after suitable conditioning, such as amplification, is applied to the operating means 19 for actuating the contacts 17. The portion of the ground fault responsive means other than the differential transformer 31 is represented by the block 37 in FIG. 1. This portion is conveniently constructed in a small package such as an integrated circuit, and if desired, it can include means for protecting against undesired grounding of the neutral conductor at or near the load, as described in copending application Ser. No. 44,187, filed June 8, 1970, and in U.S. Pat. No. 3,506,906, issued Apr. 14, 1970, both assigned to the assignee of the present invention.

Alternatively, the ground fault detecting means 18 can be of the modulating type disclosed in copending application Ser. No. 19,625, filed Mar. 16, 1970, or it can be of the type illustrated in FIG. 19 and described in detail hereinafter.

As is described more fully hereinafter, the operating means 19 includes a trip coil connected for energization by the ground fault responsive means, together with mechanical linkage for opening the contacts when the trip coil is energized.

Means is provided for testing the operation of the ground fault protector. This means includes a resistor 38 and a switch 39 connected in series between the line and neutral conductors on opposite sides of the differential transformer.

As illustrated in FIGS. 2-6, the receptacle assembly of the present invention is adapted to be mounted in a standard receptacle wiring box 41 of the duplex type. Boxes of this type are on the order of 4 inches long, 2 inches wide and 2 inches deep, and they are commonly used for housing single socket and/or switch assemblies. Box 41 is illustrated as being mounted in a recessed area formed in a building wall 42. A cover plate member 43 is mounted on the outer surface of the wall 42 over the recessed area and provides means for enclosing the box 41. The box 41 is typically fabricated of an electrically conductive metal, and the cover plate is typically fabricated of an insulative material such as plastic.

The receptacle assembly includes a housing 44 which is mounted inside the standard box 41. This housing is generally rectangular in shape and is fabricated of an insulative material such as Bakelite. The remaining components of the receptacle assembly are mounted within the housing 44. This housing is open at the top and is formed to include arc discharge openings 46 in proximity to the electrical contacts which are mounted therein. The housing 44 is mounted to the box 41 by means of a mounting plate 47. This plate is formed to include mounting tabs 48 which engage ear portions 49 on the insulative housing 44. The mounting plate is secured to the metal box by means of screws 51, and the cover plate 43 is attached to the mounting plate by means of screws 52.

A generally planar rectangular base member 56 is mounted within the housing 44 and rests upon ledges 57 which are formed in the side walls of the housing. Conventional socket assemblies 58, 59 are mounted on the upper side of this base member proximate the ends thereof. Each of these socket assemblies includes a line terminal 23, a neutral terminal 24, and a ground terminal 26 for receiving the connecting prongs of a plug such as the plug 28. The line terminals of the two socket assemblies are connected together by means of a conductor 61 disposed in a recess in the upper surface of the base member, and the neutral terminals are connected together by means of a conductor 62 which is disposed in a recess formed in the bottom surface of the base member. The ground terminals are connected together by means of a conductor 63 which is also disposed in a recess formed in the bottom surface of the base member. Thus, as will be apparent to those familiar with the art, the two socket assemblies are connected electrically in parallel.

The differential transformer 31 and remainder of the ground fault responsive means 37 are mounted in the space between the base member 56 and the bottom wall of the insulative housing.

The contacts 17 and operating means 19 are mounted on the top side of the base member between the socket assemblies 58 and 59. Two sets of contacts are provided, one for interrupting the flow of current in the line conductor and the other for interrupting the flow of current in the neutral conductor. Each of these sets of contacts includes a fixed upper contact 66 and a movable lower contact 67. An insulative mounting post 68 is mounted to the base member 56 intermediate the two sets of contacts. The upper contacts in the two sets are carried by rigid conductors 69 which are supported at one end by the insulative post 68 and are connected at their other ends to the line and neutral terminals of the socket assemblies. Thus, one of the conductors 69 connects one of the upper terminals 66 to the neutral terminal of the socket assembly 58, and the other conductor 69 connects the other upper contact to the line terminal of the socket assembly 59. Flexible conductive pigtails 71 are connected to the movable contacts in the two sets, and these pigtails pass through the torodial core of the differential transformer to form single turn primary windings. The pigtails also pass through openings formed in the bottom wall of the insulative housing and are connected to the line and neutral conductors by conventional connectors, such as wire nuts 72, in the space between the insulative housing and the standard outlet box. A third pigtail 73 is connected to the ground conductor 63 and passes through an opening in the insulative housing for connection to a grounded conductor 74 by means of a wire nut 72. Alternatively, if desired, the flexible pigtails 71 can be terminated at wiring posts mounted on the base member 56, and the connections to the wire nuts can be completed with conventional insulated wire such as 14 stranded copper wire. In this alternative arrangement, the insulated wires, rather than the flexible pigtails, pass through the differential transformer core and the openings in the housing.

The movable contacts 67 are carried by a contact arm member 76 which is fabricated of an insulative material. This member is generally T-shaped, with the contacts being mounted on the upper surface of the cross bar portion. A roller 77 is pivotally mounted in a notch formed in the base portion of this member. As is discussed hereinafter, means is provided for rotating the arm member 76 to move the contacts between open and closed positions.

The operating means includes a supporting framework which is also mounted on the upper side of the base member between the socket assemblies. This framework includes a base portion 81, a vertically extending back wall 82, vertically extending side walls 83 and a front wall 84. A solenoid 86 is mounted in the space between the front, back and side walls. This solenoid includes a trip coil 87 which is adapted for connection to the ground fault responsive means by conductors 88, and it also includes a plunger member 89 movable betweeen advanced and retracted positions in accordance with the energization of the trip coil. The supporting framework can serve as part of the magnetic circuit for operating the solenoid plunger and is preferably fabricated of a good magnetic material such as mild steel.

An upper pivot rod 91 and a lower pivot rod 92 extend horizontally between the side walls 83. A latch member 93 is pivotally mounted at one end on the upper pivot rod 91 and releasably engages the contact arm roller 77 at its other end. The latch member is linked to the armature member 89 by means of a connecting pin 94. A latch spring 96 is provided for urging the latch forward into engagement with the contact arm roller 77.

A generally U-shaped resilient member 97 is mounted on the lower pivot rod 92 and engages the contact arm member 76 intermediate the contacts 67 and the roller 77. This resilient member urges the lower contacts 67 up against the the latch member 93. The post 68 is formed to include a fulcrum portion 98 in proximity to the upper surface of the arm member 76 intermediate the contacts 67 and the resilient member 97.

Means is provided for resetting the operating means and moving the contacts to their closed position following the correction of a ground fault. This means includes a generally cylindrical member 101 which is slidably mounted in a vertically extending bore 102 formed in the post 68. The lower extremity of the member 101 engages the upper surface of the arm member 76 at a location intermediate the resilient means 97 and the lower contacts 67, thus providing means for applying a force to the contact arm generally opposite to the force applied by the resilient means 97. The cylindrical member 101 extends through an opening 103 in the cover plate 43 and through an opening 104 in the mounting plate 47. This member is movable between extended and retracted positions, and a light spring 106 is provided for holding it in its retracted position. A colored band 107 is provided on the member in such position that it is visible only when the member is in its extended position. As will appear hereinafter, the operation of the reset means is such that the contacts cannot be manually closed by it while a ground fault is present.

The resistor 38 is mounted in a vertical bore in the post 68. One terminal of this resistor is connected to the neutral pigtail on the source side of the differential transformer. In one presently preferred embodiment, this connection is made by means of a insulated wire which passes through the differential transformer core and then is connected to the neutral wiring post on the base member. The other resistor lead 111 is cut off close to the resistor and disposed in proximity to a resilient contact member 112 which is connected to the upper contact 66 connected to the line terminals of the sockets. An insulative test button 113 engages the contact member 112 and passes through an opening 116 in the frame member 47. This button extends part of the way through an opening 114 in the cover plate 43 and is accessible from outside the cover plate by means of a small or pointed instrument. Being recessed, however, it is not likely to be accidentally depressed.

Operation and use of the receptacle assembly with ground fault protection can now be described briefly. Initially, let it be assumed that an electrical appliance has been connected to one of the sockets and that the system is operating normally, that is there is no ground fault. In this condition, the trip coil 87 is deenergized, and the resilient member 96 urges the latch member 93 forward into engagement with the roller 77 of the contact arm member 76. The resilient member 97 urges the contact arm member upward, holding the contacts in their closed position. The reset member 101 is urged downward against the contact arm member by the spring 106, and it remains in its retracted position with the colored band 107 concealed by the cover plate 43.

Figure 7:
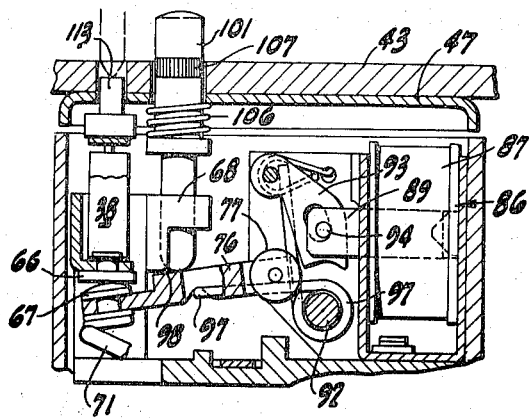
FIGS. 7–10 are fragmentary cross-sectional views, illustrating the operation of the embodiment shown in FIGS. 2–6.
Figure 8:
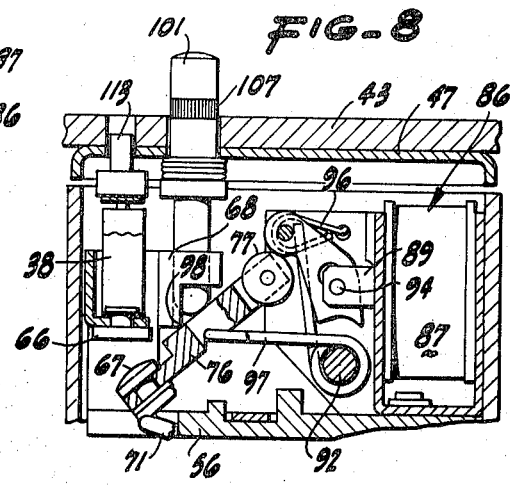

Upon the occurrence of a ground fault, or when the test button 113 is depressed, as illustrated in FIG. 7, the trip coil 87 is energized. This moves the solenoid plunger member 89 to its retracted position, drawing the latch member 93 out of engagement with the contact arm member roller 77. In this condition, the contacts 66 and 67 function as a fulcrum, and the resilient member 97 moves the roller end of the contact arm in an upward direction, producing a rocking action at the contacts. This rocking action has been found to be very desirable since it tends to break any contact welds which may have formed between the contacts. The rocking action continues until the contact arm engages the fulcrum portion 98 of the post 68. At this point, the center of rotation shifts from the contacts to the fulcrum portion 98, and the contacts are separated. As the contact arm rotates, it pushes the reset member 101 upward to its extended position, exposing the band of color 107 to provide a visible indication of the occurrence of the ground fault. The rotational movement of the contact arm continues until its contact end engages the upper surface of the base member 56. The assembly is shown in its fully tripped position in FIG. 8.

Figure 9:
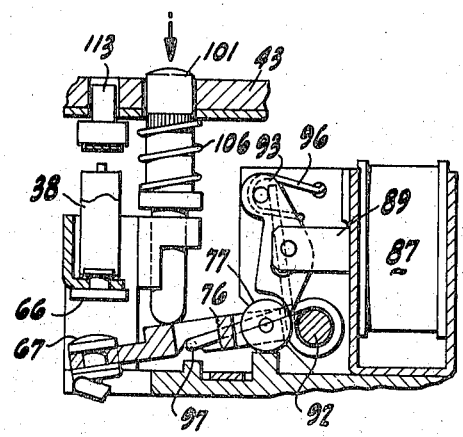
Figure 10:
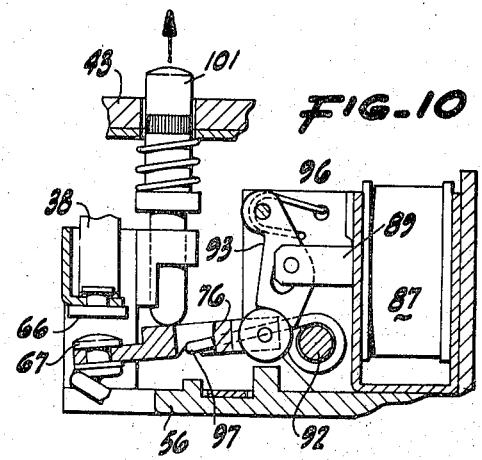

In order to reset the operating means and close the contacts, the reset member 101 is manually depressed. This exerts a force on the contact arm member opposite to the force exerted by the resilient member 97. The contact arm now pivots around the contact end which is engaging the upper surface of the base member 56, and the roller end moves downward. The resilient member 96 moves the latch member 93 back into position for engaging the roller 77. As long as the reset member 101 is depressed, the contacts will remain open, as is best seen in FIG. 9. When the reset means is released, the contact arm 76 moves upward until the roller engages the latch member 93. Thereafter, the contact arm rotates about the roller, with the contact ends thereof moving upward until the contacts are in their closed position. Thereafter, the device will again be in the normal operating condition illustrated in FIG. 6.

It is to be noted that the protective operation of the device cannot be defeated by the reset means. As long as the reset member 101 is depressed, the contacts will remain open. When the trip coil 87 is connected to remain energized throughout the ground fault, the unit cannot be reset until the ground fault is removed since the solenoid armature 89 will be in its retracted position, preventing the latch member 93 from engaging the roller 77. If the trip coil is deenergized by the ground fault, the device will trip immediately if an attempt is made to reset it during the continuance of the ground fault.

The receptacle assembly shown in FIGS. 11-17 includes a housing assembly 121 which is preferably fabricated of an insulative material. A cover plate 122 is mounted on the housing assembly by means of a mounting plate 123, and the entire assembly is mounted in a standard duplex box 124. The housing assembly includes a raised portion 121a which extends through a generally rectangular opening 122a in the cover plate. A pair of three conductor outlets 126 and 127, a reset button 128, and a test button 129 are all mounted in the raised portion of a housing assembly and accessible from the outer side of the cover plate. The line, neutral and ground terminals of outlets 126 and 127 are connected electrically and parallel by conductors 131-133.

The flow of current to conductors 131 and 132 and, hence, to outlets 126 and 127 is controlled by a contact assembly 134. This assembly includes two sets of contacts, one for the line conductor and the other for the neutral conductor. Each set includes a fixed contact 136 and a movable contact 137, with the fixed contacts being connected to the line and neutral terminals of the outlets. The movable contacts are mounted on a contact arm 138 and connected to flexible pigtail 139 which are connected to the protected line and neutral conductors. Conductor 133 is connected to ground by a third pigtail 141.

Contact arm 138 is fabricated of an insulative material, and is generally T-shaped. Contacts 137 are mounted on the cross bar portion of the arm, and the other end of the arm is releasably engaged by a latch 142 which forms a part of a clapper type solenoid assembly 143. This assembly includes a trip coil 144 and the latch or clapper 142. The coil is mounted on a generally U-shaped bracket 146, and the clapper is pivotally mounted on a pivot rod 147 which extends between the arms of the U-shaped bracket. A spring 148, carried by rod 147, engages the central portion of arm 138 and urges the arm in an upward direction, as viewed in FIG. 12. A latch spring 149 urges latch or clapper 142 toward the latching position shown in FIG. 12.

The operation of solenoid assembly 143 is controlled by a ground fault sensing module 151 which is mounted on the lower portion of housing assembly 121. In the preferred embodiment, the module contains the circuit shown in FIG. 19 which, as disclosed in copending application Ser. No. 141,297, filed May 7, 1971, can be constructed in a compact modular form. The module includes a window 152 through which the line and neutral pigtails 139 pass to form the single turn primary windings of a differential transformer. One end of solenoid coil 144 is connected to the module by a lead 153, and the other end of the coil is connected to a switch contact 154 which is normally engaged by a movable contact 156. A second movable contact 157 engages contact 156 when test button 129 is depressed. One lead 158a of a resistor 158 is connected to contact 157, and the other lead 158b of this resistor is connected to the line conductor through fixed interrupter contact 136.

Reset button 128 is movable between extended and retracted positions, and a spring 161 urges the button toward its retracted position, as illustrated in FIG. 12. The button is provided with an indicator band 128a which can be seen from the outer side of the cover plate only when the button is in its extended position. When the button is in its retracted position, the lower portion of the button extends somewhat below a shoulder 162 formed by the housing assembly.

Operation and use of the receptacle assembly shown in FIGS. 11-17 can now be described. Initially, let it be assumed that an electrical appliance has been connected to one of the outlets and that the system is operating normally, that is, there is no ground fault. In this condition, solenoid coil 144 is deenergized, and latch spring 149 urges latch or clapper 142 into engagement with the end of contact arm 138. Spring 148 urges the contact arm upward, holding the contacts in their closed position. Reset button 128 is urged downward against the contact arm by spring 161, and it remains in its retracted position with indicator band 128a concealed by cover plate 122.

If test button 129 is depressed, as illustrated in FIG. 13, contact 157 engages contact 156, connecting resistor 158 between the line and neutral conductors on opposite sides of ground fault sensing module 151, creating an imbalance in the currents in the protected conductors. The module energizes solenoid 153 in response to this imbalance, as it would in the event of a ground fault, and latch 142 is drawn out of engagement with contact arm 138. In this condition, contacts 136 and 137 function as a fulcrum, and spring 148 moves the free end of the contact arm in an upward direction, producing a rocking action at the contacts. This action continues until the contact arm engages the shoulder portion 162 of the housing assembly. At this point, the center of rotation shifts from the contacts to the shoulder portion, and the contacts are separated, as illustrated in FIG. 14. As the free end of the contact arm moves upward, it engages contact 156, moving this contact out of engagement with contact 154 to deenergize solenoid coil 144. It will be noted that interrupter contacts 136 and 137 separate before contact 156 is moved, thereby assuring interruption of the current in the protected conductor before the solenoid coil is deenergized. When the coil is deenergized, spring 149 urges latch 142 to back into position for engaging the free end of the contact arm when the arm is reset to close the contacts. With the contacts open, contact arm 138 moves reset button 128 to its extended position, exposing indicator band 128a.

After the ground fault has been corrected, the assembly can be reset by depressing reset button 128, as indicated in FIG. 15. Depressing the button moves the free end of the contact arm downward into latching engagement with latch 142. When the button is released, spring 148 will move the other end of the contact arm upwardly, closing contacts 136 and 137. It will be that when the reset button is first depressed, the free end of contact arm 138 releases contact 156 which then moves back into contact with contact 154, completing the circuit to solenoid coil 144. Thus, if someone attempts to reset the assembly before a ground fault is corrected, the unit will trip again immediately upon the closing of contacts 136 and 137.

Figure 18:
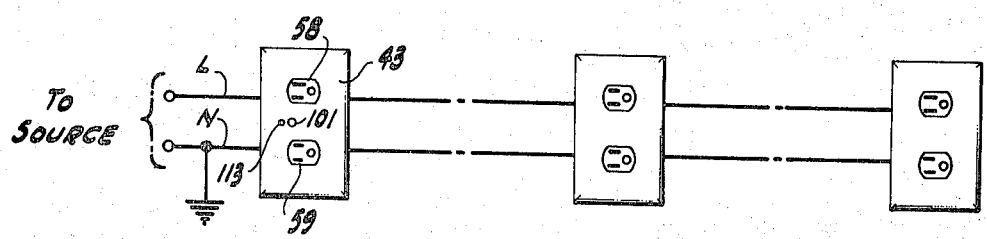
FIG. 18 is a schematic diagram, illustrating the receptacle assembly of the invention connected to provide ground fault protection for a plurality of electrical outlet boxes.
Figure 19:
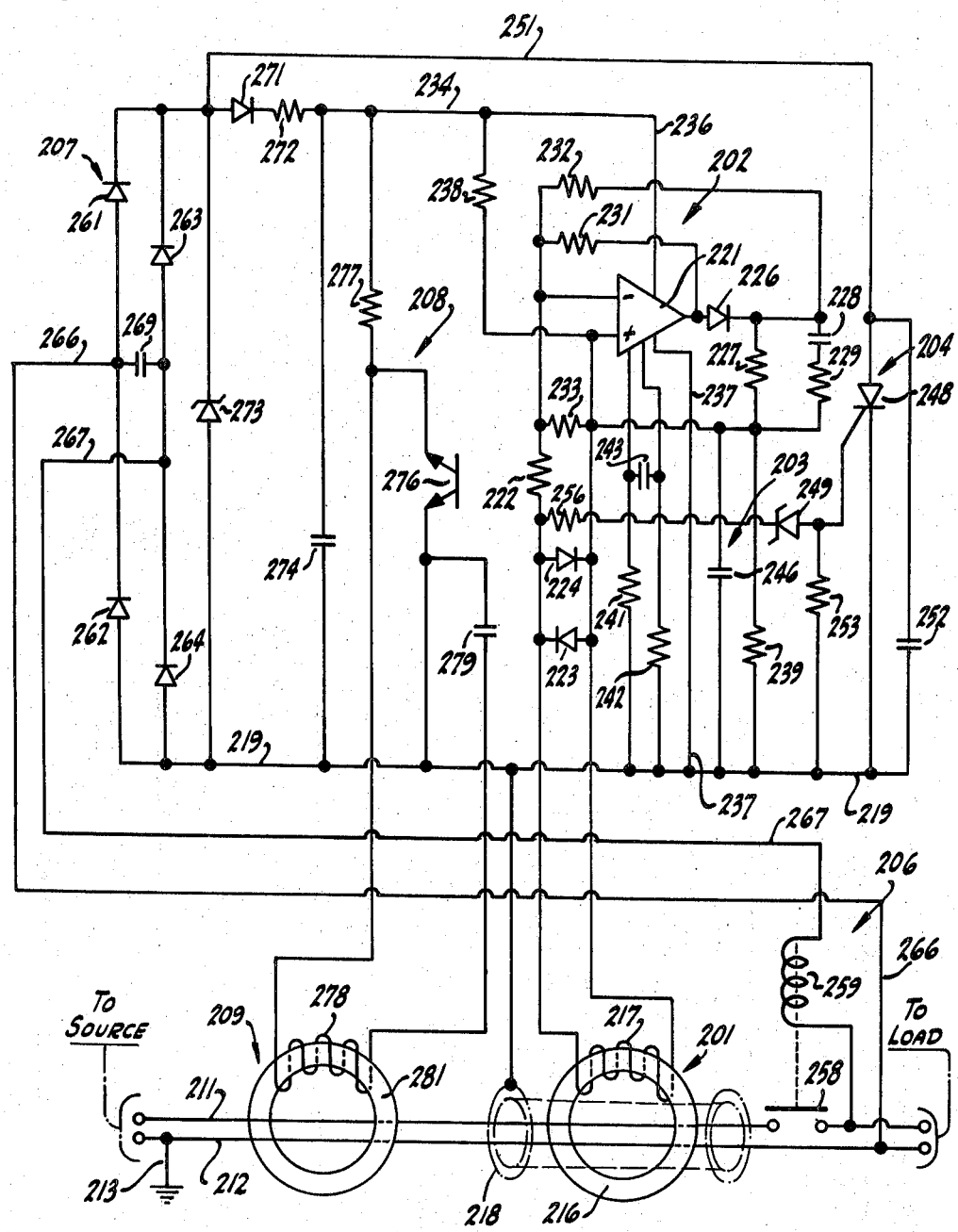
FIG. 19 is a schematic diagram of one embodiment of a ground fault responsive system which can be utilized in the receptacle assemblies shown in FIGS. 2-16.

While one of the primary advantages of the present invention is that it permits individual ground fault protection for receptacle boxes, in some instances it may be desirable to protect a plurality of outlet boxes with a single receptacle assembly incorporating the invention. As illustrated in FIG. 18, this is readily accomplished by connecting the sockets in additional outlet boxes such as boxes 171 and 172, electrically in parallel with the protected sockets of a receptacle assembly 173 of the type discussed above. Although assembly 173 is illustrated as being the type shown in FIGS. 2-10, it can also be the type shown in FIGS. 11-17. With a plurality of boxes connected in the manner illustrated, the occurrence of a ground fault in any one of the boxes will be detected by the ground fault responsive means in the one box and will cause interruption of the current to all of the boxes FIG. 19 illustrates in detail one embodiment of a ground fault protective system which can be incorporated in the receptacle assembly of the present invention. This system includes a differential transformer 201 for monitoring the flow of current in a distribution system, amplifier means 202 for amplifying the output of the differential transformer, integrator means 203 for integrating the output of the amplifier, switching means 204 for energizing an interrupter 206 when the integrated output of the amplifier reaches a predetermined level, a power supply 207, and a pulse generator 208 and coupling transfomer 209 which prevent the system from being defeated by grounding of the neutral conductor at the load.

The system is shown in connection with a distribution system having a line conductor 211 and a neutral conductor 212 which carry current between a source and a load. The neutral conductor is connected to ground at its source end, as indicated at 213. The protective system can be utilized with either single phase or polyphase power distribution systems having one or more line conductors and a neutral conductor which is connected to ground at its source end.

The differential transformer 201 includes a toroidal core 216 which is fabricated of a material having a relatively high magnetic permeability. The conductors 211 and 212 pass through this core to form single turn primary windings. A multiple turn secondary winding 217 is wound on the core, and in one presently preferred embodiment this winding has 1,000 turns. The conductors 211 and 212 are arranged in such manner that equal currents flowing through them produce a zero net magnetic flux in the torodial core 216 and a zero output signal in the secondary winding 217. When the currents in the conductors are not equal, a non-zero net magnetic flux is produced in the core 216, and a fault signal is produced in the secondary winding 217. An electrostatic shield 218 is provided between the conductors 211, 212 and the torodial core 216. This shield is electrically insulated from the conductors 211, 212 and the secondary winding 217, and it is connected electrically to a common conductor 219 in the protective system.

The amplifier means 202 includes an operational amplifier 221. One end of the secondary winding 217 of the differential transformer is connected to the inverting input of this amplifier through an input resistor 222. The other end of the secondary winding is connected to the noninverting input of the operation amplifier. A pair of oppositely polarized diodes 223 and 224 are connected across the secondary winding 217 to protect the input of the operational amplifier from being damaged by excessively large fault signals.

The output of the operational amplifier 221 is connected to the anode of a diode 226. A load resistor 227 is connected between the cathode of this diode and the noninverting input of the amplifier. A capacitor 228 and a resistor 229 are connected in series with each other across the load resistor 227 to provide an increased load at higher frequencies.

Negative feedback is provided by means of feedback resistors 231 and 232 which are connected to the inverting input terminal of the operational amplifier 221 from the anode and cathode of the diode 226, respectively. Thus, the diode and feedback resistors cooperate to provide temperature compensation for the operational amplifier. The amount of feedback is determined by the parallel resistance of the feedback resistors, and the level of temperature compensation can be adjusted by adjusting the ratio of these resistors. In this embodiment, the feedback resistors are chosen to provide sufficient feedback to reduce the gain of the operational amplifier from a gain on the order of 1,000 to a gain on the order of a few hundred. This arrangement has been found to provide unusually good temperature stability in a ground fault system operating over a wide range of temperatures.

A resistor 233 is connected between the inverting and noninverting inputs of the operational amplifier 221. This resistor serves to suppress an undesired mode of amplification which would otherwise result from the action of the diode 226. During the positive half cycle of the output of the operational amplifier, negative feedback is provided through both of the feedback resistors 231 and 232, but during the negative half cycle such feedback occurs only through the resistor 231. Thus, with the feedback resistors approximately equal in value, the amount of feedback and, consequently, the gain of the amplifier would vary by a factor of approximately two between the positive and negative half cycles. The secondary winding 217 of the differential transformer would act as a voltage doubler, tending to overcome the difference in gain. This type of amplification is relatively unstable, and the resistor 233 is included to suppress it.

As is discussed more fully hereinafter, the power supply 207 provides a source of voltage between a conductor 234 and the common conductor 219, with the conductor 234 being positive relative to the common conductor. Operating power si supplied to the operational amplifier 221 by means of leads 236 and 237 which are connected from the appropriate terminals of the operational amplifier to the positive conductor 234 and the common conductor 219, respectively. A resistor 238 is connected between the positive conductor 234 and the noninverting input of the operational amplifier, and a resistor 239 is connected between the noninverting input and the common conductor 219. These resistors are chosen to have values which bias the noninverting input to the level required for proper operation of the operational amplifier. Typically, this level is on the order of a few volts positive relative to the negative supply voltage, that is a few volts positive relative to the common conductor 219.

Input offset resistors 241 and 242 are shown connected between the input offset terminals of the operational amplifier and the common conductor 219. The values of these resistors are chosen to provide the desired input offset voltage, and with many operational amplifiers one of these resistors can be eliminated. A capacitor 243 is connected between the input offset terminals to suppress noise and reduce the effects of stray capacitance from conductors 211 and 212 which are relatively large noise sources.

The integrating means 203 includes a capacitor 246 which is connected for being charged by the output of the operational amplifier. One side of this capacitor is connected to the junction of the load resistors 227, 229 and the noninverting input terminal of the amplifier, and the other side of the capacitor is connected to the common conductor 219. The resistor 239, which helps to set the biasing level of the noninverting input, also serves as a bleeder on the integrated capacitor.

The switching means 204 includes a silicon controlled rectifier 248 and a zener diode 249. As is discussed more fully hereinafter, the anode of the SCR 248 is connected directly to the unregulated output of the power supply 207 by a lead 251. The cathode of the SCR is connected to the common conductor 219, and a capacitor 252 is connected between the anode and cathode of the SCR. This capacitor tends to suppress transient disturbances originating in the power distribution system. The anode of the zener diode 249 is connected to the gate of the SCR, and a resistor 253 is connected between the gate and the common conductor 219. The cathode of the zener diode is connected to the integrator capacitor 246 through a resistor 256 and the secondary winding 217 of the differential transformer. The zener diode determines the level to which the capacitor 246 must be charged to fire the SCR. In the preferred embodiment this diode has a zener voltage of 16 volts.

The interrupter means 206 includes a set of contacts 258 and an operating coil 259. The contacts 258 are normally closed, and they are connected in series with the line conductor 211. These contacts are adapted for opening to interrupt the flow of current in the conductor when the coil 259 is energized. If desired, similar sets of contacts can be provided in the neutral conductor 212 and/or in additional line conductors in the distribution system.

The power supply means 207 receives A.C. input power from the distribution system and delivers D.C. operating power to the remainder of the protective system. This means includes a full-wave bridge rectifier consisting of diodes 261-264. One input of the rectifier bridge is connected to the neutral conductor 212 by a lead 266, and the other input terminal of the bridge is connected to one end of the operating coil 259 by a lead 267. The other end of this coil is connected to the line conductor 211. The normal operating current drawn by the protective system is less than the minimum value required to energize the coil 259 to open the contacts 258. A capacitor 269 is connected between the two input terminals of the rectifier bridge. This capacitor cooperates with the coil 259 to form an effective filter for suppressing transient disturbances from the distribution system. The negative output terminal of the rectifier bridge is connected to the common conductor 219, and the positive output terminal of this bridge is connected to the positive conductor 234 through a diode 271 and a current limiting resistor 272. To conserve space, the resistor 272 can consist of two or more small wattage resistors connected in series.

The lead 251, which carries current to the anode of the SCR 248, is connected to the positive output terminal of the rectifier bridge ahead of the diode 271. A zener diode 273 is connected between the output terminals of the rectifier bridge. This diode provides means for suppressing surges in the distribution system voltage to prevent false tripping of the interrupter in response to such surges. This diode has a breakdown or zener voltage higher than the voltage in the distribution system and the output of the rectifier bridge. For example, with an r.m.s. voltage of 120 volts in the distribution system, the unfiltered output of the rectifier bridge would have a peak voltage on the order of 170 volts, and the zener diode 273 might have a breakdown voltage on the order of 200 volts. A filter capacitor 274 is connected across the output of the power supply between the positive conductor 234 and the common conductor 219.

The pulse generator or pulser 208 includes a bilateral switching device 276, commonly known as a diac. A resistor 277 is connected between the positive conductor 234 and one terminal of the diac. The junction of the resistor and the diac terminal is connected to one end of a multiple turn winding 278 on the coupling transformer 209. The other end of this winding is connected to the second terminal of the diac through a capacitor 279. The junction of the capacitor and second terminal is connected ot the common conductor 219.

The coupling transformer 209 provides means for coupling the output of the oscillator 208 to the line and neutral conductors. This transformer includes a toroidal core 281 which is fabricated of a material having a high magnetic permeability. The winding 278 is wound on this core, and the line and neutral conductors pass through it.

The pulser 208 serves a dual function. First, it produces a continuous series of pulses which are coupled to the line and neutral conductors to provide grounded neutral protection and protection against shoring of the line conductor to to an unprotected conductor. Second, it regulates the output of the power supply at a voltage level corresponding to the firing level of the diac. In the preferred embodiment, the diac has a firing voltage on the order of 32 volts, and the oscillator regulates the voltage between the positive conductor 234 and the common conductor 219 at a level on the order of 32 to 38 volts, as is more fully discussed hereinafter.

Although a pulse generator such as the pulser 208 is the presently preferred type of oscillator for use in the present invention, other types of oscillators can be used if desired. Such an oscillator might, for example, produce a sinusoidal signal having a frequency on the order of a few kilohertz. Because of its short duty cycle, the pulser has one important advantage over a continuous wave oscillator in that it requires substantially less power for operation.

Operation and use of the protective system shown in FIG. 19 can be described briefly. In the absence of a ground fault, the currents in the line and neutral conductors 211, 212 produce a zero net magnetic flux in the differential transformer core 216 and a zero output signal in the secondary winding 217. The output of the operational amplifier 221 is also zero, and the voltage across the integrating capacitor. 246 remains at the level to which the noninverting input of the operational amplifier is biased. Since this level is below the breakdown voltage of the zener diode 249 which controls the firing of the SCR 248, the SCR remains turned off. In this situation, the current drawn from the power supply 207 is less than the value which will energize the interrupter coil 259, and the contacts 258 remain closed.

When a ground fault occurs, the currents in the line and neutral conductors 211, 212 are no longer balances, and a fault signal is produced in the differential transformer secondary winding 217. This fault signal is amplified by the operational amplifier, and the amplified fault signal is rectified by the diode 226 and then applied to the integrating capacitor 246 through the load resistor 227. When the capacitor 246 is charged to the level determined by the breakdown voltage of the zener diode 249, the SCR 248 fires, substantially increasing the current drawn from the power supply 207. This increase in current energizes the coil 259 to the point where the contacts 258 open, interrupting the flow of current in the distribution system.

The pulser 208 operates continuously. The capacitor 279 is charged by current flowing through the resistor 277 and the coupling transformer winding 278 which functions as an inductor. When the voltage across the capacitor 279 and the inductor 278 reaches the firing voltage of the diac 276, the diac fires, discharging the capacitor 279 through the inductor 278. When the charge on the capacitor 279 falls below the minimum value for maintaining the diac in its conductive state, the diac turns off. The charge on the capacitor 279 then begins to charge again with current from the resistor 277, and the cycle repeats. The voltage pulse generated in the inductor 278 is coupled to the line and neutral conductors by the transformer 209. If the neutral conductor becomes grounded on the load side of the differential transformer 201, a pulse current is induced in this conductor by the transformer 209. This current flows through the neutral conductor to ground on the load side of the differential transformer and back to the neutral conductor through the ground connection at the source end of this conductor. This pulse current produces a current imbalance in line and neutral conductor which is sensed by the differential transformer and results in the contacts 258 being opened. Similarly, a pulse current will be induced in the line conductor 211 if this conductor should become shorted to an unprotected conductor or if it should become shorted to itself on both sides of the protective system.

The pulse width and repetition rate are determined by the values of the resistor 277 and the capacitor 279, the inductance of the winding 278, the firing voltage of the diac 276 and the output voltage of the power supply 207. In the preferred embodiment, these values are chosen to provide a repetition rate substantially greater than the frequency of the current in the distribution system. This rate varies somewhat with the output voltage of the rectifier bridge, but this variation is not detrimental to the operation of the system. The values of the capacitor 228 and resistor 229 in the output of the amplifier are chosen to pass the pulse frequency. Thus, these components bypass the load resistor 227 and increase the sensitivity of the system to the pulse current.

The manner in which the pulser regulates the output of the power supply can now be described briefly. Without the pulser connected to the power supply, the voltage across the filter capacitor 274 would be substantially equal to the peak output voltage of the rectifier bridge, i.e., on the order of 170 volts. However, the action of the diac 276 prevents the voltage from reaching this value. The values of the resistor 277 and capacitor 279 are chosen to be such that the diac fires each time the voltage on the filter capacitor 274 builds up to about 32 volts. When the diac fires, the filter capacitor is discharged through the resistor 277 and the diac. The diac turns off when the voltage on the capacitor 274 drops to approximately 29 volts. Thus, the voltage on the filter capacitor is regulated at a level between 29 and 32 volts.

The system shown in FIG. 12 provides reliable interruption in response to very small fault currents, and it is relatively immune to false tripping. In the preferred embodiment, the gain of the operational amplifier 221, the values of the components in the integrator 203, and the breakdown voltage of the zener diode 249 are chosen so that the SCR 248 will fire, interrupting the flow of current in the distribution circuit, in response to fault currents as small as 4 ma. or less. The use of the zener diode in series with the gate of the SCR provides a higher threshold voltage and a more sharply defined firing level than would otherwise be possible. The action of the integrator 203 is such that larger fault currents require less time to produce tripping than do smaller fault currents. The bleeder resistor 239 prevents small disturbances, such as noise, from building up on the integrator capacitor 246 and causing false tripping. The interrupter coil 259 and the capacitors 269 and 252 provide an effective filter for preventing transient disturbances in the distribution system from causing false tripping, and the zener diode 273 further prevents false tripping due to large transients, such as line surges.

Figure 6:
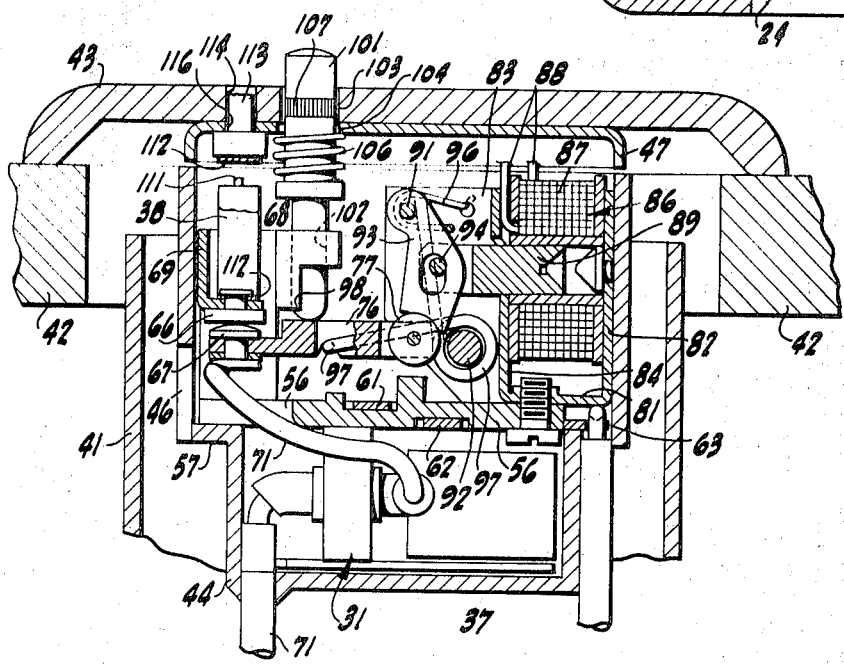
FIG. 6 is a cross-sectional view taken along line 6—6 in FIG. 3.

As mentioned above, the circuit of FIG. 19 can be constructed in the form of a small modular package which is readily mounted within the housing 44 of the receptacle assembly as indicated by the reference numeral 37 in FIG. 6. Although a new set of reference numerals has been applied to the elements in FIG. 19, certain of these elements correspond to certain of the elements shown in the preceding figures. Thus, for example, the differential transformer 201 corresponds to the differential transformer 31, and the operating coil 259 corresponds to the solenoid coils 87 and 144. Similarly, the line conductor 211 and the neutral conductor 212 correspond to the line conductor L and the neutral conductor N, respectively.

It is apparent from the foregoing that a new and improved receptacle assembly with ground fault protection has been provided. While only the presently preferred embodiments have been described, as will be apparent to those familiar with the art, certain changes and modifications can be made without departing from the scope of the invention as defined by the following claims.

We claim:

1. In an electric receptacle assembly suitable for mounting in a wall outlet box, socket means for receiving the plug of an electrical appliance, a set of contacts movable between open and closed positions for interruptably connecting the socket means to a power source, a contact arm member carrying one of the contacts at one end thereof, a latch member releasably engaging the other end of the arm member, resilient means engaging the arm member intermediate its ends and urging the contacts together when the latch member is engaging the arm member, said resilient means also urging the arm member to pivot about the contacts to provide a rocking movement between the contacts when the latch member is disengaged from the arm member, ground fault sensing means for monitoring the flow of current through the socket means, and means responsive to the fault sensing means for disengaging the latch member from the arm member.

2. An electric receptacle assembly as in claim 1 further including an additional set of contacts movable between open and closed positions, one contact of said additional set being carried by said arm member.

3. An electric receptacle assembly as in claim 1 together with additional socket means connected electrically in parallel with the first named socket means.

4. An electric receptacle assembly as in claim 1 wherein said ground fault sensing means includes a differential transformer having a toroidal core of magnetic material, a plurality of primary windings passing through said toroidal core and connected between the socket means and power source, and a secondary winding having a plurality of turns wound on said toroidal core, said primary and secondary windings being arranged in such manner that a ground fault signal is produced in said secondary winding when the current flowing to the appliance from the power source is not equal to the current flowing back to the power source through the primary windings.

5. An electric receptacle assembly as in claim 4 further including amplifier means for amplifying the fault signal produced in the secondary winding of the differential transformer, and means for integrating the amplified fault signal, the latch member being disengaged from the arm member when the integrated signal reaches a predetermined level.

6. An electric receptacle assembly as in claim 1 wherein said ground fault sensing means includes means for causing the latch member to be disengaged from the arm member in response to a ground fault current on the order of 5 milliamperes.

7. An electric receptacle assembly as in claim 1 wherein the assembly is mounted in a housing having a cover plate, together with load means within said housing and a test switch for connecting said load means to the socket means to simulate a ground fault, said test switch including an operating button recessed inwardly from the outer surface of the cover plate in an opening formed therein.

8. An electric receptacle assembly as in claim 1 together with additional socket means located remotely of the first named socket means for receiving the plug of an electrical appliance and means connecting the additional socket means electrically in parallel with the first named socket means so that the current flowing to the additional socket means is also monitored by the ground fault responsive means.

9. An electric receptacle assembly as in claim 1 wherein the means for disengaging the latch member from the arm member includes an operating coil.

10. An electric receptacle assembly as in claim 1 further including fulcrum means disposed for engaging the arm member intermediate the contact carried thereby and the resilient member when the arm member has rotated a predetermined amount about the contacts, said fulcrum means thereafter cooperating with said resilient means to urge said contacts apart.

11. An electric receptacle assembly as in claim 10 together with reset means for returning the contacts to their closed position, said reset means being arranged in such manner that the contacts cannot be held in their closed position by said reset means during the presence of a ground fault.

12. An electric receptacle assembly as in claim 11 wherein said reset means includes a manually operable member engaging the arm member for exerting a force on said arm generally opposite to that exerted by the resilient means and additional resilient means engaging the latch member for urging said member into engagement with the arm member.

13. An electric receptacle assembly as in claim 12 wherein the assembly is mounted in an enclosure having a cover plate and the manually operable member is movable between extended and retracted positions relative to said cover plate, said extended and retracted positions corresponding respectively to the open and closed positions of said contacts, said member carrying an indicator which is visible externally of said cover plate when said member is in its extended position.

14. In an electric receptacle assembly suitable for mounting in a wall outlet box for connecting electrical appliances to the conductors of a power distribution system, socket means for receiving the plug of an electrical appliance and carrying current between the conductors of the distribution system and the appliance, a set of electrical contacts movable between open and closed positions, said set including a first contact for connection to one of said conductors and a second contact electrically connected to said socket means, operating means including an operating coil for moving said contacts between their open and closed positions, ground fault responsive means operably connected to the operating means for monitoring the flow of current in the conductors and causing movement of the contacts to their open position in response to an imbalance in the currents in said conductors, and switch means for connecting the operating coil to the ground fault responsive means as the contacts are moved toward their closed position and disconnecting the operating coil from the ground fault responsive means when the contacts are moved to their open position.

15. An electric receptacle assembly as in claim 14 further including means for producing an additional current in the neutral conductor in the event that said conductor is connected to ground through the socket means.

16. An electric receptacle assembly as in claim 15 wherein said means for producing an additional current in the neutral conductor includes source means for providing a signal of higher frequency than the normal current in the conductors and a transformer coupling said source means to said neutral conductor.

17. In an electric receptacle assembly suitable for mounting in a standard duplex outlet receptacle wiring box, an insulative housing smaller than a standard box and adapted to fit therein, at least two sockets mounted in said housing for receiving the connecting plugs of electrical appliances, each of said sockets including line and neutral terminals for delivering current to an appliance having its plug connected therewith, first and second sets of electrical contacts within said housing movable between open and closed positions, said first set including a first contact connected to the line terminals of the sockets and a second contact for connection to the line conductor of a power distribution system, said second set including a first contact connected to the neutral terminals of the sockets and a second contact for connection to the neutral conductor of the distribution system, operating means including a solenoid coil within the housing for moving the contacts to their open position in response to a fault signal, ground fault responsive means mounted within the housing for monitoring the flow of current in the conductors and delivering a fault signal to the operating means in response to a current imbalance in the conductors, and switch means for connecting the operating coil to the ground fault responsive means as the contacts are moved toward their closed position and disconnecting the coil from the ground fault responsive means when the contacts are moved to their open position.

18. An electric receptacle assembly as in claim 17 together with an additional outlet box having a socket for receiving the plug of an electrical appliance and means connecting the socket in said additional box electrically in parallel with the sockets in the insulative housing so that the current flowing to the socket in said additional box is monitored by the ground fault responsive means in said insulative housing.

* * * * *